United States Patent
Kwon et al.

(10) Patent No.: US 10,954,620 B2
(45) Date of Patent: Mar. 23, 2021

(54) WASHING MACHINE AND METHOD OF CONTROLLING THE SAME

(71) Applicant: LG Electronics Inc., Seoul (KR)

(72) Inventors: Oshin Kwon, Seoul (KR); Byunghyun Moon, Seoul (KR)

(73) Assignee: LG Electronics Inc., Seoul (KR)

( * ) Notice: Subject to any disclaimer, the term of this patent is extended or adjusted under 35 U.S.C. 154(b) by 364 days.

(21) Appl. No.: 15/926,056

(22) Filed: Mar. 20, 2018

(65) Prior Publication Data

US 2018/0266030 A1 Sep. 20, 2018

(30) Foreign Application Priority Data

Mar. 20, 2017 (KR) .................. 10-2017-0034839

(51) Int. Cl.
*D06F 37/22* (2006.01)
*H02J 50/12* (2016.01)
*D06F 37/20* (2006.01)
*D06F 33/00* (2020.01)

(52) U.S. Cl.
CPC ............ *D06F 37/225* (2013.01); *H02J 50/12* (2016.02); *D06F 33/00* (2013.01); *D06F 37/203* (2013.01)

(58) Field of Classification Search
CPC ...... D06F 37/203; D06F 37/225; D06F 37/22; D06F 37/02; D06F 37/20; D06F 33/00; D06F 33/02; H02J 50/12
USPC ............................. 68/23.2, 140, 13 R; 8/137
See application file for complete search history.

(56) References Cited

U.S. PATENT DOCUMENTS

2014/0366589 A1* 12/2014 Park ................. D06F 37/203
68/140
2015/0354123 A1* 12/2015 Kim ................. D06F 37/225
68/12.06

FOREIGN PATENT DOCUMENTS

| EP | 2514864 | 10/2012 |
|---|---|---|
| EP | 2955263 | 12/2015 |
| WO | WO2013022164 | 2/2013 |

OTHER PUBLICATIONS

Extended European Search Report in European Application No. 18162771.2, dated Jul. 20, 2018, 7 pages.

* cited by examiner

*Primary Examiner* — Tinsae B Ayalew
(74) *Attorney, Agent, or Firm* — Fish & Richardson P.C.

(57) ABSTRACT

The present disclosure relates to a washing machine, having an actively movable balancer, and method of controlling the same. The washing machine according to an embodiment of the present disclosure includes: a balancing unit to move along a circumference of a drum to reduce imbalance due to an unbalanced distribution of the laundry; a transmission coil provided at a tub to generate a wireless power signal and transmit power wirelessly to the balancing unit; a transmission converter to apply power at a driving frequency to the transmission coil; a voltage measurer to measure a transmission voltage, which is a voltage of the transmission coil; and a transmission controller to control the transmission converter based on the transmission voltage measured by the voltage measurer, thereby transmitting sufficient power wirelessly to the balancing unit in a short period of time.

13 Claims, 8 Drawing Sheets

WASHING MACHINE AND METHOD OF CONTROLLING THE SAME

CROSS-REFERENCE TO RELATED APPLICATION

This application claims the priority benefit of Korean Patent Application No. 10-2017-0034839, filed on Mar. 20, 2017, in the Korean Intellectual Property Office, the disclosure of which is incorporated herein by reference in its entirety.

FIELD

The present disclosure relates to a washing machine and method of controlling the same, and more particularly to a washing machine having an actively movable balancer, and a method of controlling the same.

BACKGROUND

A washing machine is an appliance for cleaning by performing washing, rinsing, and spin-drying cycles to remove contaminants from clothing, bedding, and the like (hereinafter referred to as "laundry") by using water, detergent, and mechanical operations.

The washing machine is provided with a balancer to reduce imbalance which occurs when laundry in a drum is unevenly distributed. As the balancer for use in the washing machine, a ball balancer or a liquid balancer is used. However, there is a problem in that the ball balancer or the liquid balancer moves passively according to rotation of a drum, such that as the ball balancer or the liquid balancer moves to an opposite side of the center of mass of laundry, the drum continuously rotates until the imbalance is reduced. In order to solve such problem, a method of actively moving the balancer is suggested.

In order for the balancer to move actively, it is required to supply power to the balancer. Recently, there is suggested a method of transmitting power wirelessly by using a transmitting coil disposed around the drum and a receiving coil disposed around the balancer. However, as the balancer rotates along with the drum, the transmitting coil and the receiving coil meet for a very short period of time as the drum rotates. Accordingly, there is a need for a method of supplying sufficient power for the movement of the balancer even in a very short period of time.

SUMMARY

It is an object of the present invention to provide a washing machine for wirelessly transmitting sufficient power to a balancing unit in a short period of time, and a method of controlling the same.

It is another object of the present invention to provide a washing machine for wirelessly transmitting power to the balancing unit by considering safety of an electronic device for wireless power transmission, and a method of controlling the same.

The objects of the present invention are not limited to the aforementioned objects and other objects undescribed herein will be clearly understood by those skilled in the art from the following description.

In accordance with the present invention, the above and other objects can be accomplished by providing a washing machine including: a balancing unit which moves along a circumference of a drum to reduce imbalance which occurs due to an unbalanced distribution of the laundry; a transmission coil which is provided at a tub, and generates a wireless power signal to transmit power wirelessly to the balancing unit; a transmission converter configured to apply power at a driving frequency to the transmission coil; a voltage measurer configured to measure a transmission voltage, which is a voltage of the transmission coil; and a transmission controller configured to control the transmission converter based on the transmission voltage measured by the voltage measurer, thereby transmitting sufficient power wirelessly to the balancing unit in a short period of time.

The transmission controller may convert the transmission voltage to a coil current, which is an electric current, and may change the driving frequency of the transmission converter according to the coil current. In this case, the transmission controller may convert the transmission voltage to the coil current by using a predetermined linear relation.

In response to the coil current being equal to or less than a predetermined minimum current, the transmission controller may increase the driving frequency, and in response to the coil current being equal to or higher than a predetermined maximum current, the transmission controller may decrease the driving frequency.

The minimum current may be set based on a minimum power required for the balancing unit to move actively; and the maximum current may be set by considering safety of the balancing unit.

Further, in accordance with the present invention, the above and other objects can be accomplished by providing a method of controlling a washing machine, the method including: generating a wireless power signal at a set driving frequency and transmitting the generated wireless power signal to the balancing unit by the wireless power transmitter; measuring a transmission voltage, which is a voltage of a transmission coil which generates a wireless power signal; and changing the driving frequency from the transmission voltage.

The changing of the driving frequency from the transmission voltage may include converting the transmission voltage to a coil current, which is an electric current, by using a predetermined linear relation; and in response to the coil current being equal to or less than a predetermined minimum current, increasing the driving frequency, and in response to the coil current being equal to or higher than a predetermined maximum current, decreasing the driving frequency.

The minimum current may be set based on a minimum power required for the balancing unit to move actively; and the maximum current may be set by considering safety of the balancing unit or the wireless power transmitter.

The specifics of other embodiments are included in the detailed description and drawings.

The washing machine and method of controlling the same of the present disclosure have one or more of the following effects.

First, even when the balancing unit rotates along with the drum, the wireless power transmitter may wirelessly transmit sufficient power to the balancing unit in a short period of time.

Secondly, even when sufficient power may be transmitted by controlling the wireless power transmitter, electronic components of the wireless power transmitter or the balancing unit may be prevented from being damaged by fire.

Thirdly, even when the wireless power transmitter may not communicate with the balancing unit which receives power, there is no problem in wireless power transmission by only controlling the wireless power transmitter.

The effects of the present disclosure are not limited to the above-described effects, and other effects undescribed herein may be clearly understood by those skilled in the art from the claims.

DETAILED DESCRIPTION

Advantages and features of the present disclosure and methods for accomplishing the same will be more clearly understood from exemplary embodiments described below with reference to the accompanying drawings. However, the present disclosure is not limited to the following embodiments, but may be implemented in various different forms. The embodiments are provided only to complete disclosure of the present disclosure and to fully provide a person having ordinary skill in the art to which the present disclosure pertains with the category of the present disclosure, and the present disclosure will be defined by the scope of the appended claims. Like reference numerals generally denote like elements through the specification.

Hereinafter, embodiments of the present disclosure will be described in detail with reference to the accompanying drawings for explaining a washing machine and a method of controlling the same.

Figure 1:
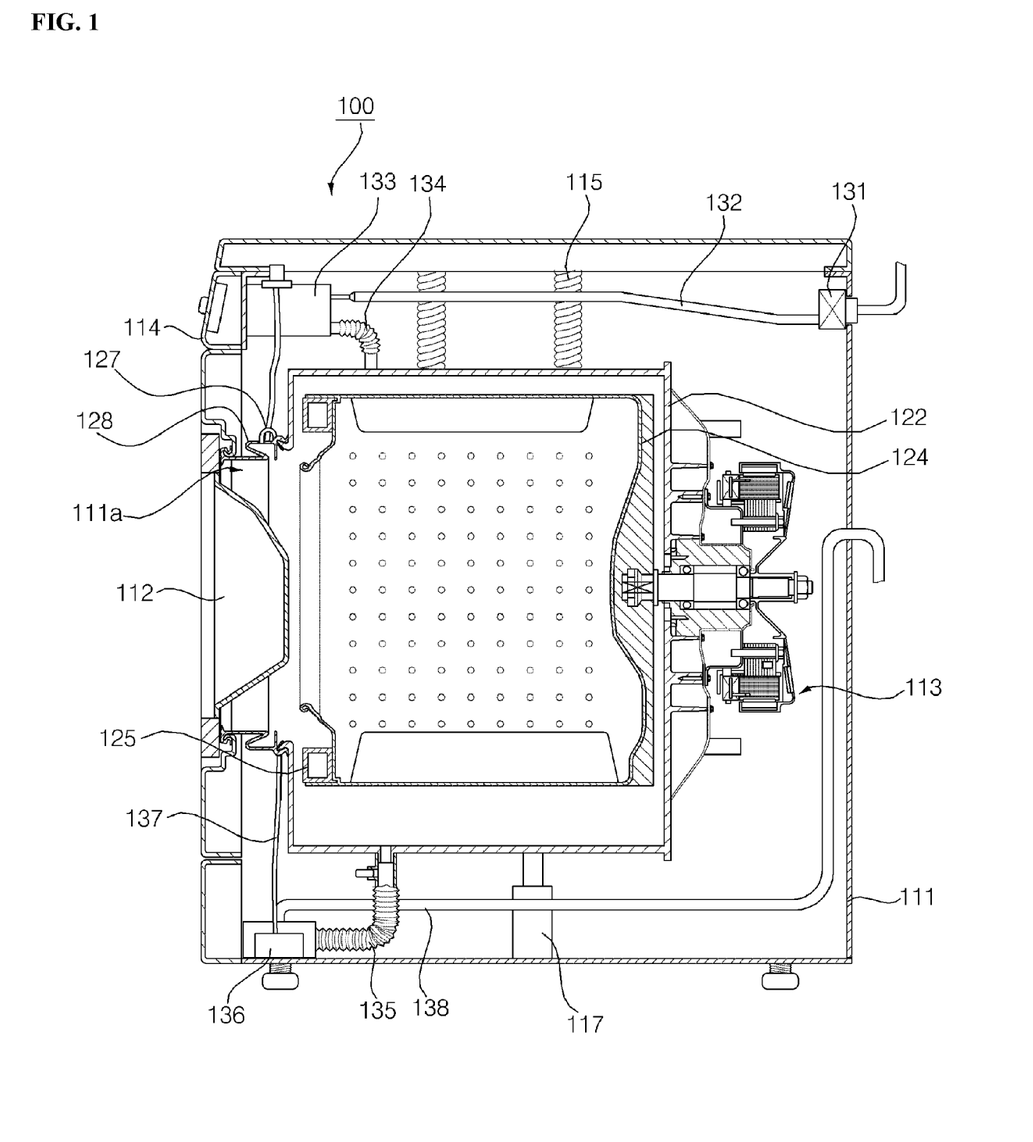
FIG. 1 is a cross-sectional view of a washing machine according to an embodiment of the present disclosure.
Figure 2:
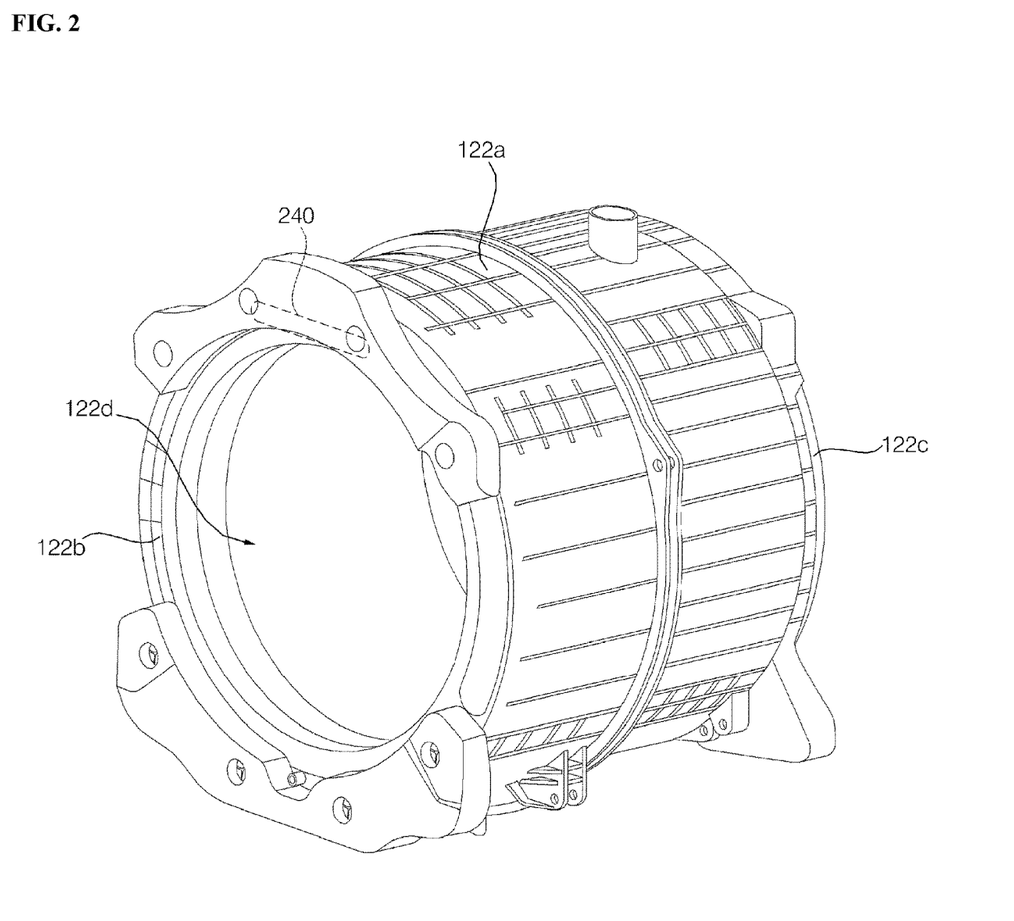
FIG. 2 is a perspective view of a tub of a washing machine according to an embodiment of the present disclosure.
Figure 3:
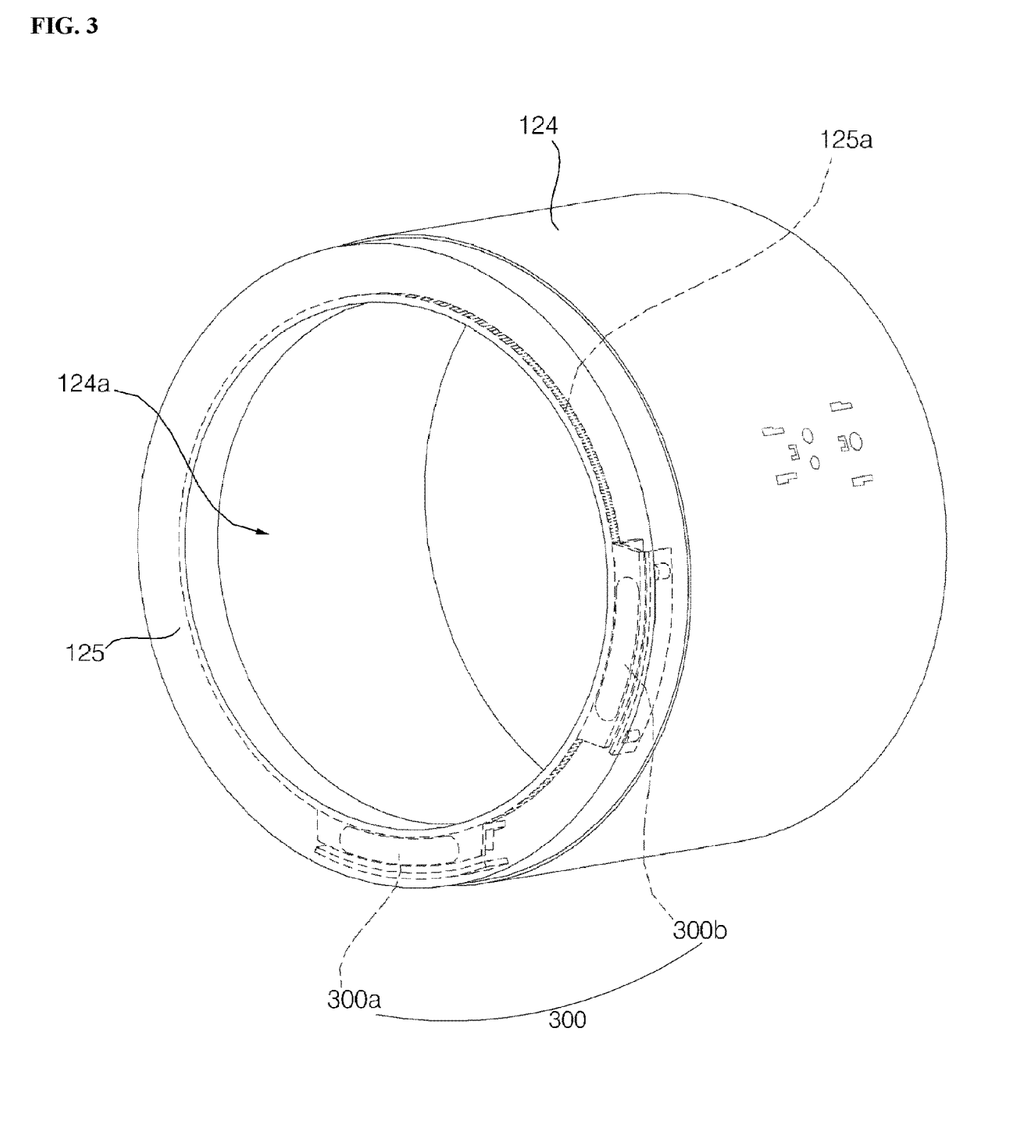
FIG. 3 is a perspective view of a drum of a washing machine according to an embodiment of the present disclosure.

FIG. 1 is a cross-sectional view of a washing machine according to an embodiment of the present disclosure; FIG. 2 is a perspective view of a tub of a washing machine according to an embodiment of the present disclosure; and FIG. 3 is a perspective view of a drum of a washing machine according to an embodiment of the present disclosure.

The washing machine 100 according to an embodiment of the present disclosure includes a cabinet 111 which forms an external appearance of the washing machine 100; a door 112 which opens and closes one side of the cabinet 111 so that laundry may be put into the cabinet 111; a tub 122 which is provided in the cabinet 111, is supported by the cabinet 111, and in which wash water is contained; a drum 124 which has a cylindrical shape, is provided in the tub 122, and rotates when the laundry is loaded; a drum motor 113 which provides torque to the drum 124 to rotate the drum 124; a balancing unit 300 which moves along the circumference of the drum 124 to reduce imbalance which occurs due to an unbalanced distribution of laundry when the drum 124 rotates; a detergent box 133 in which detergent is held; and a control panel 114 which receives a user's input and displays status of a washing machine.

The cabinet 111 is provided with a laundry inlet hole 111a, through which laundry is loaded into the cabinet 111. The door 112 is rotatably connected with the cabinet 111 to open and close the laundry inlet hole 111a. The cabinet 111 is provided with the control panel 114. The cabinet 111 is provided with the detergent box 133 which may be withdrawn therefrom.

A spring 115 and a damper 117 are provided in the cabinet 111 to absorb shock of the tub 122. The tub 122 contains wash water. The tub 122 is disposed outside the drum 124 while surrounding the drum 124.

The tub 122 includes: a tub main body 122a which has a cylindrical shape and both ends of which are open; a front tub cover 122b which has a ring shape and is disposed at a front side of the tub main body 122a; a rear tub cover 122c which has a disc shape and is disposed at a rear side of the tub main body 122a. Hereinafter, the front side refers to the side of the door 112, and the rear side refers to the side of the drum motor 113. A tub hole 122d is formed at the front tub cover 122b. The tub hole 122d is formed to communicate with the laundry inlet hole 111a to allow the laundry to be put into the drum 124.

The drum motor 113 is provided at the rear tub cover 122c to generate torque. The drum motor 113 is connected with a rotation axis 116 to rotate the drum 124. The drum motor 113 may rotate the drum 124 at various speeds and directions. The drum motor 113 includes: a stator (not shown) wound with a coil; and a rotor (not shown) which rotates by generating electromagnetic interaction with the coil.

The rotation axis 116 connects the drum motor 113 with the drum 124. The rotation axis 116 transfers torque of the drum motor 113 to the drum 144 to rotate the drum 124. One end of the rotation axis 116 is connected to the center of rotation at the rear side of the drum 124, and the other end of the rotation axis 116 is connected with the rotor (not shown) of the drum motor 113.

The drum 124 rotates with the laundry loaded therein. The drum 124 is disposed in the tub 122. The drum 124 is formed in a cylindrical shape and is rotatable. The drum 124 has a plurality of through-holes through which wash water may pass. The drum 124 rotates by receiving the torque of the drum motor 213.

A drum hole 124a is provided at a front side of the drum 124. The drum hole 124a is formed to communicate with the laundry inlet hole 111a and the tub hole 122d so that the laundry may put into the drum 124. A guide rail 125 is connected to a front and/or a rear circumference of the drum 124. In the embodiment, the guide rail 125 is provided on a front circumference of the drum 124.

A gasket 128 seals a space between the tub 122 and the cabinet 111. The gasket 128 is interposed between the opening of the tub 122 and the laundry inlet hole 111a. The gasket 128 absorbs shock which is delivered to the door 112 when the drum 124 rotates, and prevents wash water in the tub 122 from leaking to the outside. The gasket 128 may be provided with a circulation nozzle 127 which sprays wash water into the drum 124.

The detergent box 133 may hold a detergent, a fabric softener, bleach, and the like. It is desired that the detergent box 133 is retractably provided at the front surface of the cabinet 111. When wash water is supplied, the detergent in the detergent box 133 is mixed with the wash water to be introduced into the tub 122.

The cabinet 111 includes: a water supply valve 131 which adjusts introduction of the wash water supplied from an external water source; a water supply passage 132 through which the wash water, introduced into the water supply valve, flows to the detergent box 133; and a water supply pipe 134 through which the wash water, mixed with the detergent in the detergent box 133, is introduced into the tub 122.

The cabinet 111 includes: a drain pipe 135 through which the wash water in the tub 122 is drained; a pump 136 which discharges the wash water in the tub 122; a circulation passage 137 which circulates the wash water; a circulation nozzle 127 which introduces the wash water is into the drum 124; and a drain passage 138 through which the wash water is drained to the outside. Depending on embodiments, the pump 136 may include a circulation pump and a drain pump which may be connected to the circulation passage 137 and the drain passage 138 respectively.

A plurality of balancing units 300 move along the guide rail 125 of the drum 124, to change the center of gravity of the drum 124. In this case, the center of gravity of the drum 124 does not refer to the center of mass of the drum 124 itself, but refers to a common center of gravity of objects, including the drum 124, the laundry which is loaded in the drum 124, the guide rail 125, the plurality of balancing units 300, and other elements attached to the drum 24, which rotate along with the drum 124 when the drum 124 rotates.

The plurality of balancing units 300 move along the front circumference of the drum 124, to adjust the center of gravity of the drum 124 when laundry is unevenly distributed. When the drum 124 rotates with the unbalanced laundry, vibration and noise are caused by imbalance, in which a geometrical center of the rotation axis 116 (the center of gravity) of the drum 124 does not coincide with a real center of gravity of the drum 124. The plurality of balancing units 300 may reduce the imbalance of the drum 124 by causing the center of gravity of the drum 124 to be close to the rotation axis 116. In the embodiment, the plurality of balancing units 300 are two units of a first balancing unit 300a and a second balancing unit 300b.

The plurality of balancing units 300 move actively along the guide rail 125. The active movement refers to movement of the plurality of balancing units 300 along the guide rail 125 by using their own power.

The guide rail 125 is a passage where the plurality of balancing units 300 move. The guide rail 125 is formed in a ring shape and is connected to a front end circumference of the drum 124.

A transmission coil 240 for wireless power transmission to the plurality of balancing units 300 is disposed at the front tub cover 122b and/or the rear tub cover 122c. In the embodiment, the transmission coil 240 is disposed at the front tub cover 122b. The transmission coil 240 is disposed at a position facing the guide rail 125. The transmission coil 240 is formed as a coil which generates a wireless power signal which is a magnetic field. The transmission coil 240 will be described in detail later with reference to FIGS. 7 and 8.

The control panel 114 may include: an input unit (not shown), which receives input of wash cycles selected by a user, or input of various operation commands such as operation time of wash cycles, reservation, and the like; and a display unit (not shown) which displays an operation state of the washing machine 100.

Figure 4:
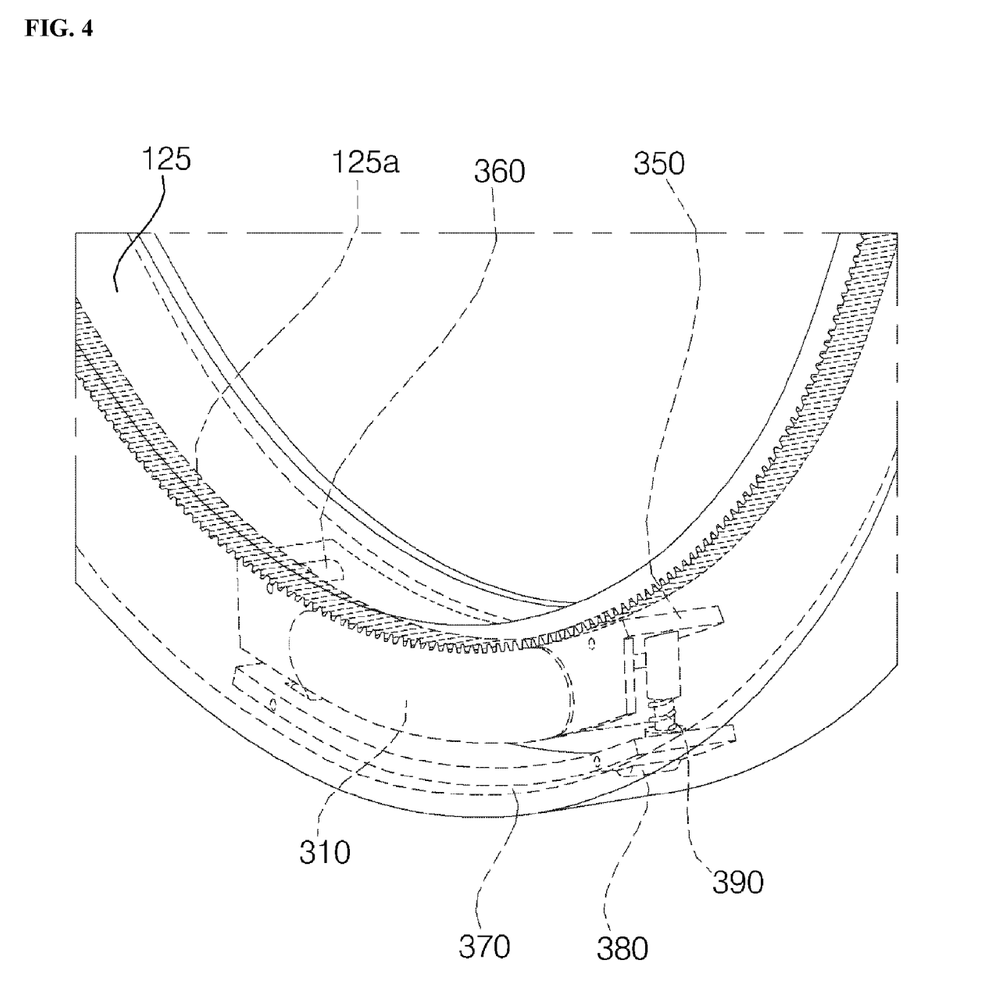
FIG. 4 is a partial perspective view of a washing machine according to an embodiment of the present disclosure.
Figure 5:
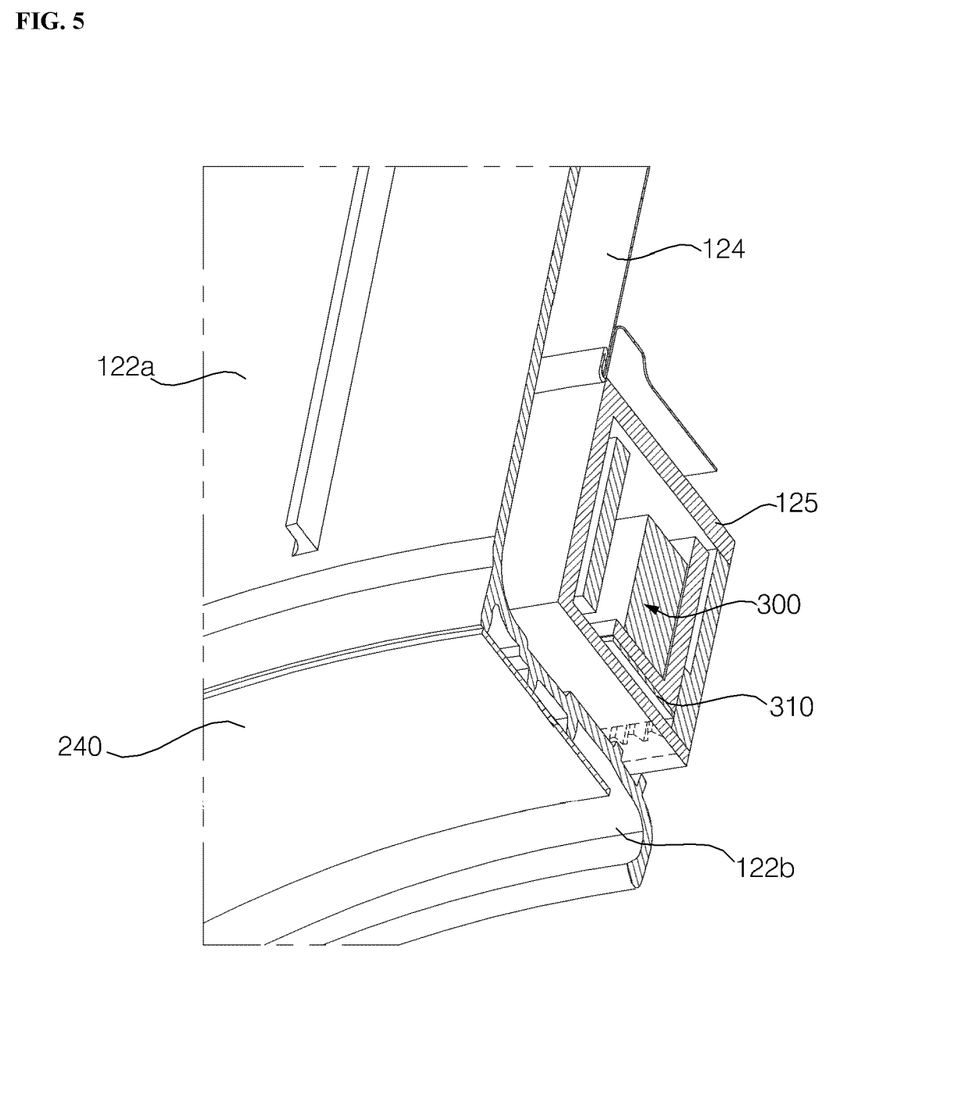
FIG. 5 is a partial cross-sectional view of a washing machine according to an embodiment of the present disclosure.
Figure 6:
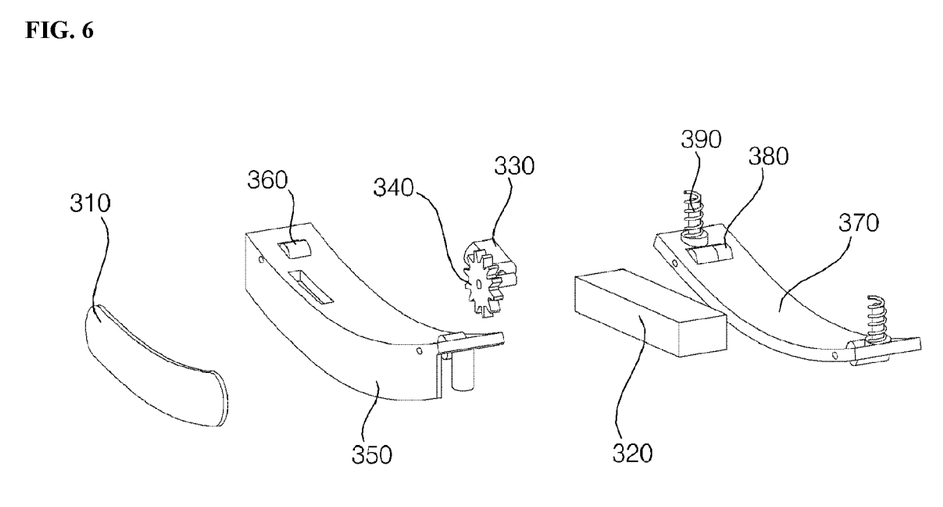
FIG. 6 is an exploded perspective view of a balancing unit of a washing machine according to an embodiment of the present disclosure.

FIG. 4 is a partial perspective view of a washing machine according to an embodiment of the present disclosure; FIG. 5 is a partial cross-sectional view of a washing machine according to an embodiment of the present disclosure; and FIG. 6 is an exploded perspective view of a balancing unit of a washing machine according to an embodiment of the present disclosure.

The balancing unit 300 according to an embodiment of the present disclosure includes: a reception coil 310 which generates electric power by electromagnetic induction by receiving the wireless power signal from the transmission coil 240; a driving module 330 which generates driving power by using the electric power generated by the reception coil 310; a pinion gear 340 which rotates by receiving the driving power from the driving module 330; an upper frame 350 which includes the driving module 330 and the pinion gear 340; a lower frame 370 which is slidably connected with the upper frame 350; an elastic body 390 interposed between the upper frame 350 and the lower frame 370; and an electronic component module 320 in which electronic components are included.

The reception coil 310 generates power by electromagnetic induction by receiving the wireless power signal, which is a magnetic field, generated by the transmission coil 240. The reception coil 310 is disposed on a surface that faces the tub 122 of the upper frame 350 so as to oppose the transmission coil 240. The reception coil 310 is formed as a coil which generates electric power by electromagnetic induction caused by a magnetic field. The reception coil 310 will be described in detail later with reference to FIGS. 7 and 8.

The driving module 330 may generate driving power by using electric power, which is supplied from an external source and is transmitted wirelessly through the transmission coil 240 and the reception coil 310. It is desired that the driving module 330 is a motor which generates torque. The driving module 330 rotates the pinion gear 340. In the case where the driving module 330 is a motor, a worm gear (not shown) is interposed between the motor and the pinion gear 340, such that the worm gear may rotate the pinion gear 340. It is desired that the driving module 330 is disposed at the upper frame 350.

The pinion gear 340 rotates by receiving driving power from the driving module 330. A rack gear 125a is disposed on an inner diameter surface of the guide rail 125; and the pinion gear 340 is engaged with the rack gear 125a.

The rack gear 125a is formed along the inner diameter surface of the guide rail 125. The cross-section of the guide rail 125 is formed in a square shape, and the inner diameter surface of the guide rail 125 refers to a surface located close to the center of rotation of the drum 124, among the inner side surfaces of the guide rail 125.

The pinion gear 340 rotates while being engaged with the rack gear 125a to actively move the balancing unit 300. As the pinion gear 340 is engaged with the rack gear 125a, the balancing unit 300 may be prevented from moving freely by the dead load or rotation of the drum 124.

The upper frame 350 forms the frame of the balancing unit 300. The upper frame 350 is disposed on the inner diameter surface of the guide rail 125. The upper frame 350 has a side surface which is formed in an arc shape so as to move along the guide rail 125.

The upper frame 350 includes the driving module 330, the pinion gear 340, the electronic component module 320, an upper roller 360, and the transmission coil 240. The upper frame 350 is connected with the lower frame 370, and the elastic body 390 is interposed between the upper frame 350 and the lower frame 370.

The electronic component module 320 includes various electronic components, which are provided for driving the driving module 330 by using electric power generated by the transmission coil 240.

The upper roller 360 is rotatably provided at the upper frame 350. The upper roller 360 may roll while being firmly pressed against the inner diameter surface of the guide rail 125. The upper roller 360 is provided to prevent the upper frame 350 from being directly in contact with the inner diameter surface of the guide rail 125. When the pinion gear 340 is engaged with the rack gear 125a, the upper roller 360 prevents an elastic force, provided by the elastic body 390, from being concentrated on the pinion gear 340. It is desired that a plurality of upper rollers 360 are provided.

The lower frame 370 forms a lower frame of the balancing unit 300. The lower frame 370 is disposed on an outer diameter surface of the guide rail 125. The outer diameter surface of the guide rail 125 refers to a surface that faces the inner diameter surface on the inner side of the guide rail 125. The lower frame 370 is formed in an arc shape so as to move along the guide rail 125. The lower frame 370 includes a lower roller 380.

The lower roller 380 is rotatably provided at the lower frame 370. The lower roller 380 may roll while being firmly pressed against the outer diameter surface of the guide rail 125. The lower roller 380 is provided to prevent the lower frame 370 from being directly in contact with the outer diameter surface of the guide rail 125. It is desired that a plurality of lower rollers 380 are provided.

Figure 7:
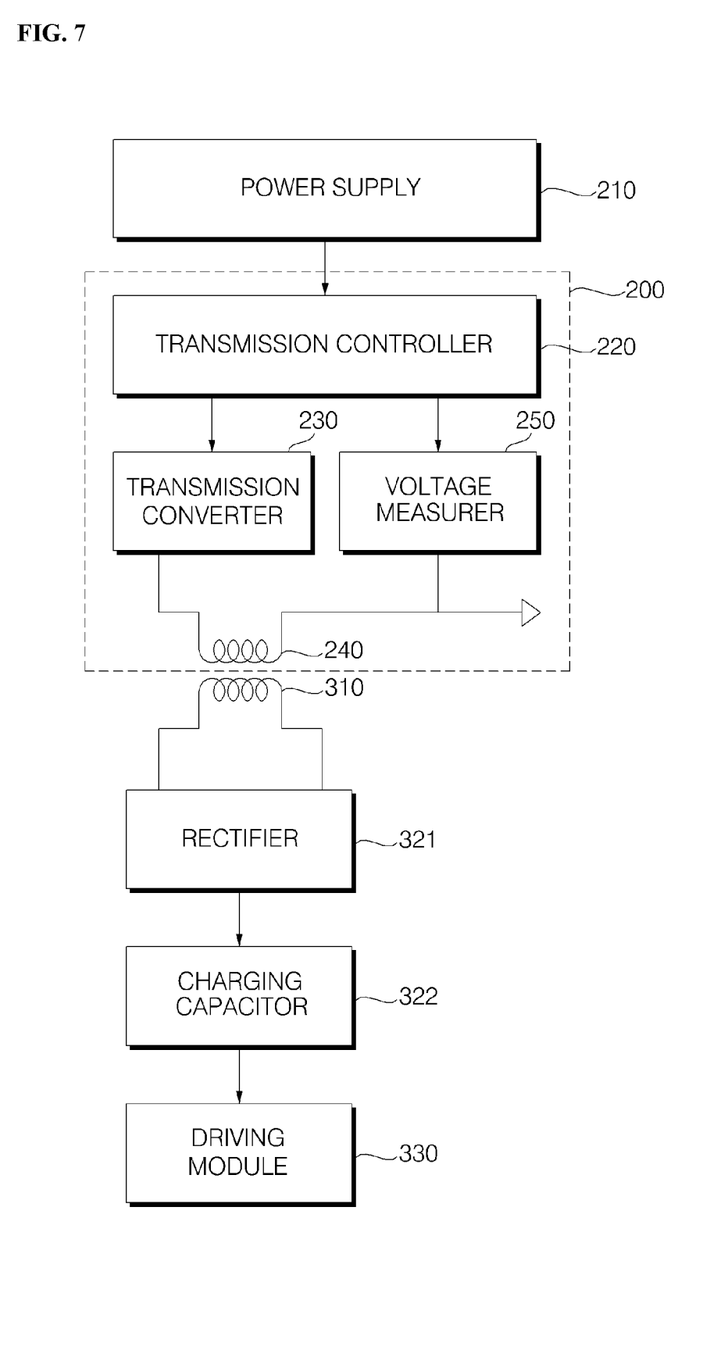
FIG. 7 is a block diagram illustrating a washing machine according to an embodiment of the present disclosure.

FIG. 7 is a block diagram illustrating a washing machine according to an embodiment of the present disclosure. The washing machine according to an embodiment includes: a power supply 210 which is connected with an external power source to provide power; and a wireless power transmitter 200 which wirelessly transmits power to the balancing unit 300, in which the wireless power transmitter 200 includes: the aforementioned transmission coil 240 which generates a wireless power signal to wirelessly transmit power to the balancing unit 300; a transmission converter 230 which applies power at a predetermined driving frequency to the transmission coil 240; a voltage measurer 250 which measures a transmission voltage which is a voltage of the transmission coil 240; and a transmission controller 220 which controls the transmission converter 230 based on the transmission voltage measured by the voltage measurer 250.

The power supply 210 converts commercial electric power, which is an alternating current supplied from an external power source, into a direct current, and supplies the direct current to the transmission converter 230. It is desired that the power supply 210 is provided in the cabinet 111 or at the control panel 114. The power supplied after conversion by the power supply 210 may also be supplied to the drum motor 113.

The transmission converter 230 converts the direct current, supplied from the power supply 210, into an alternating current (AC) waveform. The transmission converter 230 includes a switching device which converts the direct current (DC) into the alternating current (AC), and a driving frequency of the switching device is set by the transmission controller 220. The alternating current (AC) may drive the transmission coil 240 to form a magnetic field around the transmission coil 240.

As described above, the transmission coil 240 is disposed at the tub 122 and generates a wireless power signal which is a magnetic field. The transmission coil 240 is connected with a transmitting capacitor (not shown) to form a resonance circuit. As the alternating current (AC) flows to the transmission coil 240, a wireless power signal, which is a magnetic field, is generated according to a change in current.

The voltage measurer 250 measures a voltage of the transmission coil 240. The voltage measurer 250 may capture a voltage from the transmission coil 240 by using a capacitor, and may measure the voltage by using an Analog to Digital Converter (ADC). The voltage measurer 250 may transmit a transmission voltage, which is the measured voltage, to the transmission controller 220.

The transmission controller 220 controls the transmission converter 230 based on the transmission voltage measured by the voltage measurer 250. The transmission controller 220 controls a driving frequency of the transmission converter 230 based on the transmission voltage measured by the voltage measurer 250. Further, the transmission controller 220 may control an output voltage or current of the transmission converter 230. The transmission controller 220 will be described in detail later with reference to FIG. 8.

The washing machine according to an embodiment of the present disclosure includes: the aforementioned reception coil 310 which generates power by receiving a wireless power signal; a rectifier 321 which converts power, generated by the reception coil 310, from an alternating current to a direct current; and a charging capacitor 322 which charges the power converted by the rectifier 321.

As described above, the reception coil 310 generates power by electromagnetic induction by receiving a wireless power signal which is a magnetic field generated by the transmission coil 240. The reception coil 310 is connected with a receiving capacitor (not shown) to form a resonance circuit. When the balancing unit 300 passes the transmission coil 240, the reception coil 310 receives the wireless power signal, generated by the transmission coil 240, to generate power having an AC waveform.

The rectifier 321 converts power, generated by the receiving coil 310, from an alternating current to a direct current. The rectifier 321 may include a smoother which makes the rectified current a smooth and stable current.

The charging capacitor 322 may temporarily charge power supplied from the rectifier 321. As the balancing unit 300 may not include an electric condenser due to the limitations on size and weight, such that the charging capacitor 322 may charge power by using a capacitor and may supply the power to the driving module 330.

The aforementioned rectifier 321 and the charging capacitor 322 are included in the electronic component module 320.

Figure 8:
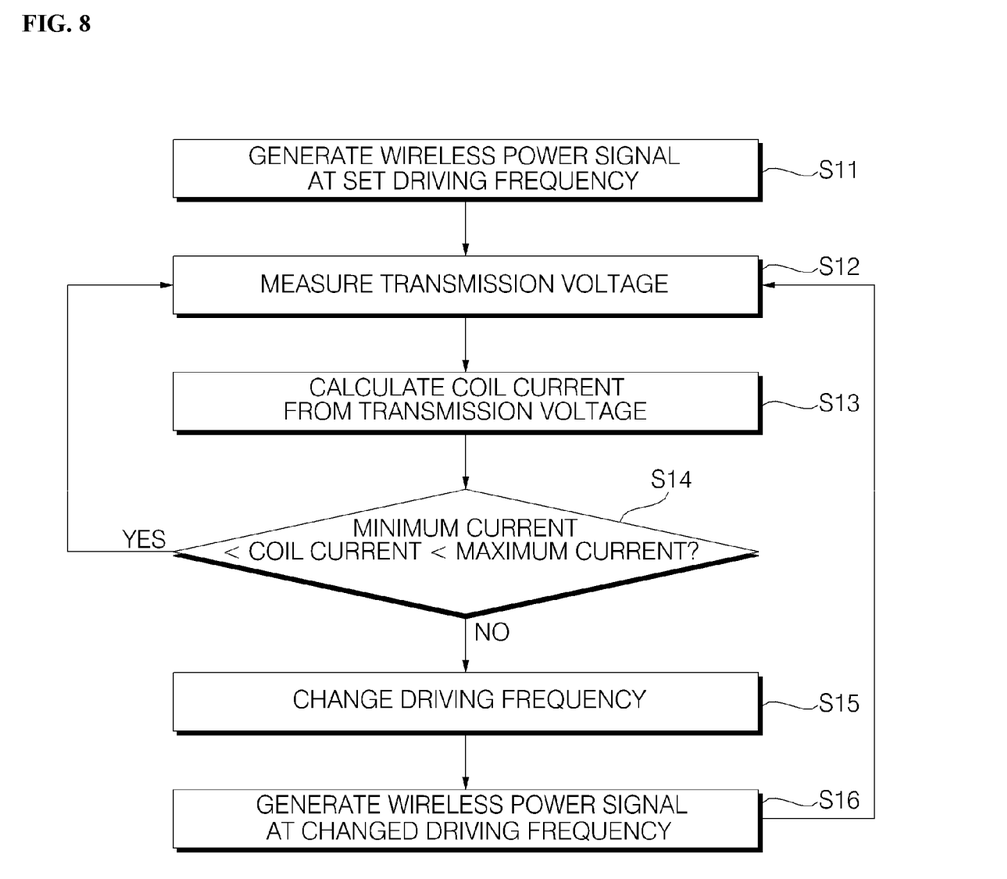
FIG. 8 is a flowchart illustrating a method of controlling a washing machine according to an embodiment of the present disclosure.

FIG. 8 is a flowchart illustrating a method of controlling a washing machine according to an embodiment of the present disclosure.

As the reception coil 310 of the balancing unit 300 rotates with the drum 124, the reception coil 310 and the transmission coil 240 meet only for a very short period of time to receive power wirelessly. Further, the balancing unit 300 temporarily stores the wirelessly received power in the charging capacitor 322 having a small power capacity, such that the wireless power transmitter 200 is required to transmit sufficient power in a very short period of time. However, unlike general wireless power transmission, the wireless power transmitter 200 and the balancing unit 300 of the present disclosure do not communicate with each other, such that the balancing unit 300 may not transfer the transmitted power or generated voltage to the wireless power transmitter 200. Accordingly, the wireless power transmitter 200 is required to transmit power enough to drive the driving module 330 of the balancing unit 300 in a very short transmission time of several ms without knowing the power transmitted to the balancing unit 300 or the generated voltage. Furthermore, while the wireless power transmitter 200 continuously generates a wireless power signal, the balancing unit 300 receives the generated power signal only during a short period of time, such that in the case where an excessive amount of power is transmitted, there is a concern that the transmitting capacitor, the receiving capacitor, or the charging capacitor 322 may be damaged by fire. Accordingly, the inventors of the present disclosure have conducted research to provide a method of controlling the wireless power transmitter 200 by considering safety and a transmission time of the wireless power transmitter 200 and power for driving the driving module 330.

A transmission resonance frequency (Fxt), which is a resonance frequency of a transmitting-side resonance circuit formed by the transmission coil 240, is determined by a capacity of the transmission coil 240 and a capacity of a capacitor. Further, a reception resonance frequency (Frx), which is a resonance frequency of a receiving-side resonance circuit formed by the reception coil 310, is determined by a capacity of the reception coil 310 and a capacity of a capacitor. The driving frequency (Fop) of the transmission converter 230 is set by the transmission controller 220. The driving frequency (Fop) has the following relationship with the transmission resonance frequency (Ftx) and the reception resonance frequency (Frx).

$$Ftx < Fop < Frx$$

As described above, it is required to transmit power enough to drive the driving module 330 of the balancing unit 300. Power supplied from the rectifier 321 has a proportional relationship with the rectified voltage which is a voltage output by the rectifier 321. Experiments showed that as the driving frequency (Fop) becomes closer to the reception resonance frequency (Frx), the rectified voltage of the rectifier 321 is increased. That is, as the driving frequency (Fop) is approximate to the reception resonance frequency (Frx), power supplied by the rectifier 321 is increased.

As described above, power should be transmitted wirelessly during a short transmission time when the reception coil 310 and the transmission coil 240 meet each other. Experiments showed that as the driving frequency (Fop) becomes closer to the transmission resonance frequency (Ftx), a transmission time is shortened.

Further, as described above, it is required to limit power transmission to prevent capacitors from being damaged by fire.

As shown in experiments, a coil current, which is a current flowing in the transmission coil, has a predetermined range to satisfy the above requirements. That is, it is desired that the coil current is in a range between a minimum current and a maximum current. Further, it has been confirmed through experiment that between the set transmission resonance frequency (Ftx) and reception resonance frequency (Frx), the coil current is increased as the driving frequency (Fop) is increased; and the coil current is decreased as the driving frequency (Fop) is decreased.

Accordingly, by increasing the driving frequency (Fop) if the coil current at the set transmission resonance frequency (Ftx) and reception resonance frequency (Frx) is equal to or less than a minimum current; and by reducing the driving frequency (Fop) if the coil current is equal to or higher than a maximum current, sufficient power may be transmitted in a short transmission time, and electronic components may be prevented from being damaged by fire.

Measuring the coil current is a matter of concern, but experiments showed that a transmission voltage measured by a voltage measurer 250 is proportional to the transmission coil in a linear relation. Accordingly, by converting the transmission voltage measured by the voltage measurer 250 into a coil current by using the linear relation, the driving frequency (Fop) may be changed according to the coil current.

The above description will be described below as a controlling method with reference to FIG. 8.

The wireless power transmitter 200 generates a wireless power signal at the set driving frequency (Fop) in S11. The transmission converter 230 of the wireless power transmitter 200 converts a direct current, supplied from the power supply 210, to an alternating current having a set driving frequency (Fop), and applies the alternating current to the transmission coil 240. The transmission coil 240 generates a wireless power signal, which is a magnetic field, in response to input of the alternating current from the transmission converter 230. The balancing unit 300 receives power wirelessly by receiving the generated wireless power signal.

The driving frequency (Fop) is set by the transmission controller 220; and it is desired that the initial driving frequency (Fop) is set to a median value between the transmission resonance frequency (Ftx), which is determined by the capacity of the transmission coil 240 of the transmitting-side resonance circuit and the capacity of a capacitor, and the reception resonance frequency (Frx) which is determined by the capacity of the reception coil 310 of the receiving-side resonance circuit and the capacity of a capacitor.

The wireless power transmitter 200 measures a transmission voltage in S12. The voltage measurer 250 of the wireless power transmitter 200 captures a voltage from the transmission coil 240 by using a capacitor, and measures a voltage by using an Analog to Digital Converter (ADC). The voltage measurer 250 transfers the transmission voltage, which is the measured voltage, to the transmission controller 220.

The wireless power transmitter 200 calculates a coil current from the transmission voltage in S13. The transmission controller 220 of the wireless power transmitter 200 converts the transmission voltage, which is transferred from the voltage measurer 250, to a coil current by using a predetermined linear relation.

The wireless power transmitter 200 determines whether the coil current is in a range between a predetermined minimum current and a predetermined maximum current in S14. The transmission controller 220 of the wireless power transmitter 200 determines whether the calculated coil current exceeds the predetermined minimum current and is below the predetermined maximum current. In the case where the calculated coil current is in a range between the predetermined minimum current and the predetermined maximum current, the wireless power transmitter 200 continues to measure the transmission voltage in S12.

In the case where the coil current is equal to or less than predetermined minimum current or is equal to or higher than the predetermined maximum current, the wireless power transmitter 200 changes the driving frequency (Fop) in S15. In response to the calculated coil current being equal to or less than the predetermined minimum current, the transmission controller 220 of the wireless power transmitter 200 increases the driving frequency (Fop); and in response to the calculated coil current being equal to or higher than the predetermined maximum current, the transmission controller 220 of the wireless power transmitter 200 decreases the driving frequency (Fop).

The wireless power transmitter 200 generates a wireless power signal at the changed driving frequency (Fop) in S16 The transmission converter 230 of the wireless power transmitter 200 converts a direct current, supplied from the power supply 210, to an alternating current having the changed driving frequency (Fop), and applies the alternating current to the transmission coil 240; and the transmission coil 240 generates a wireless power signal, which is a magnetic field, in response to the input of the alternating current from the transmission converter 230. The balancing unit 300 receives power wirelessly by receiving the generated wireless power signal.

While the present disclosure has been shown and described with reference to the exemplary embodiments thereof, it should be understood that the present disclosure is not limited to the specific embodiments, and various modifications and variations may be made by those skilled in the art without departing from the scope and spirit of the invention as defined by the appended claims, and the modified implementations should not be construed independently of the technical idea or prospect of the present disclosure.

EXPLANATION OF REFERENCE NUMERALS

111: Cabinet
113: Drum Motor
122: Tub
124: Drum
125: Guide Rail
240: Transmission Coil
300: Balancing Unit
310: Reception Coil

What is claimed is:

1. A washing machine, comprising:
a tub;
a drum that is located in the tub, that is configured to receive laundry, and that is configured to rotate with respect to the tub, the drum having a cylindrical shape;
a balancing unit configured to move along a circumference of the drum to balance a weight distribution of laundry in the drum;
a transmission coil that is located at the tub, that is configured to generate power, and that is configured to wirelessly supply power to the balancing unit;
a transmission converter configured to supply power to the transmission coil at a driving frequency;
a voltage detector configured to measure a transmission voltage of the transmission coil; and
a transmission controller configured to control the transmission converter based on the measured transmission voltage,
wherein the transmission controller is further configured to convert the transmission voltage to a coil current, and to control the driving frequency of the transmission converter according to the coil current.

2. The washing machine of claim 1, wherein the transmission controller is further configured to convert the transmission voltage to the coil current based on a linear relationship between the transmission voltage and the coil current.

3. The washing machine of claim 2, wherein the transmission controller is further configured to:

based on the coil current being less than or equal to a predetermined minimum threshold, increase the driving frequency of the transmission converter; and
based on the coil current being greater than or equal to a predetermined maximum threshold, decrease the driving frequency of the transmission converter.

4. The washing machine of claim 3, wherein the predetermined minimum threshold corresponds to a minimum power level that allows movement of the balancing unit along the circumference of the drum, and
wherein the predetermined maximum threshold corresponds to a limit of a power level transmitted to the balancing unit.

5. The washing machine of claim 1, wherein the transmission converter is configured to supply alternating current (AC) power to the transmission coil at the driving frequency, and
wherein the transmission coil is configured to generate a magnetic field based on the received AC power.

6. The washing machine of claim 5, further comprising a reception coil located at the balancing unit and configured to wirelessly receive power from the transmission coil based on electromagnetic induction between the transmission coil and the reception coil.

7. A washing machine comprising:
a tub;
a drum that is located in the tub, that is configured to receive laundry, and that is configured to rotate with respect to the tub, the drum having a cylindrical shape;
a balancing unit configured to move along a circumference of the drum to balance a weight distribution of laundry in the drum;
a transmission coil that is located at the tub, that is configured to generate power, and that is configured to wirelessly supply power to the balancing unit;
a transmission converter configured to supply power to the transmission coil at a driving frequency;
a voltage detector configured to measure a transmission voltage of the transmission coil;
a transmission controller configured to control the transmission converter based on the measured transmission voltage; and
a reception coil located at the balancing unit and configured to wirelessly receive power from the transmission coil based on electromagnetic induction between the transmission coil and the reception coil,
wherein the transmission converter is configured to supply alternating current (AC) power to the transmission coil at the driving frequency,
wherein the transmission coil is configured to generate a magnetic field based on the received AC power,
wherein the transmission coil defines a first resonance frequency, and the reception coil defines a second resonance frequency, and
wherein the transmission controller is further configured to control the driving frequency of the transmission converter between the first resonance frequency and the second resonance frequency.

8. The washing machine of claim 7, wherein an initial value of the driving frequency is a median of the first resonance frequency and the second resonance frequency.

9. The washing machine of claim 7, wherein the second resonance frequency exceeds the first resonance frequency.

10. A washing machine comprising:
a tub;

a drum that is located in the tub, that is configured to receive laundry, and that is configured to rotate with respect to the tub, the drum having a cylindrical shape;

a balancing unit configured to move along a circumference of the drum to balance a weight distribution of laundry in the drum;

a transmission coil that is located at the tub, that is configured to generate power, and that is configured to wirelessly supply power to the balancing unit;

a transmission converter configured to supply power to the transmission coil at a driving frequency;

a voltage detector configured to measure a transmission voltage of the transmission coil; and a transmission controller configured to control the transmission converter based on the measured transmission voltage, wherein the transmission coil is coupled to a circumference of the tub, and is configured to transmit power to the balancing unit based on the balancing unit passing the transmission coil along the circumference of the drum in a state in which the transmission coil is spaced apart from the balancing unit in an axial direction of the drum.

11. The washing machine of claim 10, further comprising a front tub cover that is disposed at a front side of the tub, wherein the transmission coil is disposed at the front tub cover at a position forward relative to the balancing unit in the axial direction.

12. The washing machine of claim 10, further comprising:
a front tub cover that is disposed at a front side of the tub; and
a rear tub cover that is disposed at a rear side of the tub, wherein the transmission coil is disposed at the front cover at a position forward relative to the balancing unit in the axial direction, or at the rear cover at a position rearward relative to the balancing unit in the axial direction.

13. The washing machine of claim 12, wherein the transmission coil is disposed at the front tub cover at the position forward relative to the balancing unit in the axial direction.

\* \* \* \* \*